Patented July 11, 1950

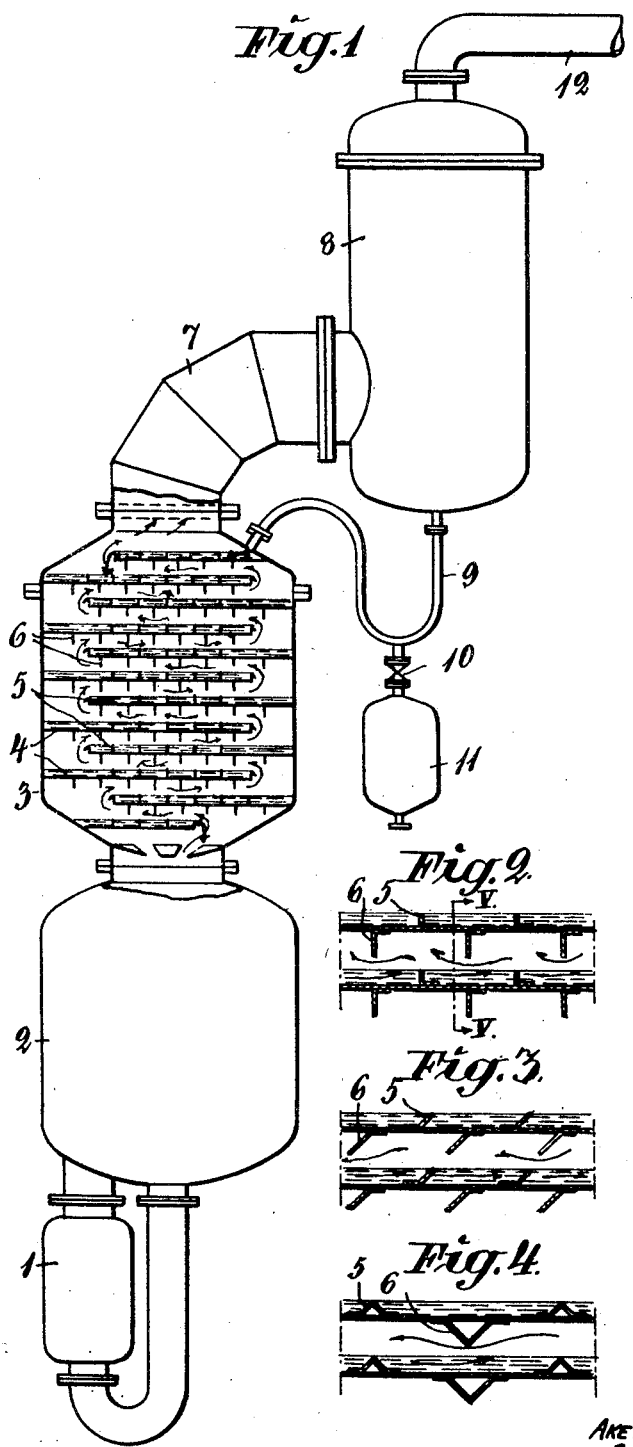

2,515,090

UNITED STATES PATENT OFFICE 2,515,090

FRACTIONATING COLUMN

Åke Vilhelm Bernhard Linder, Alfredshem, Sweden, assignor to Mo Och Domsjö Aktiebolag, Ornskoldsvik, Sweden Application March 26, 1947, Serial No. 737,360
In Sweden March 19, 1946

4 Claims. (Cl. 202—158)

For separating a mixture of liquids into its components mainly two different types of distillation columns are used, viz. plate columns with liquid-return pipes and perforated plate columns or bell columns on one side and columns packed with fillings on the other side. In the first-mentioned kinds of columns the ascending vapour passes through layers of liquid present on the plates of the column, and hereby high-boiling constituents of the vapour are absorbed by the liquid and exchanged for the low-boiling constituents of the latter. Consequently, the vapours are enriched with low-boiling constituents and, provided that the column has a sufficient height and that the quantity of reflux is great enough, the lowest boiling constituent may be recovered in pure state from the top of the column.

Said columns allow a good fractionation, but they are not suitable for vacuum distillation, especially not high-vacuum distillation. On the passage of the vapours through the liquid layers there will be a successive drop of pressure which is added from layer to layer. Consequently, when distilling in vacuum, there will be a less high vacuum at the bottom of the column than at the top thereof. On account hereof the boiling temperature in the distillation still, even at a high vacuum at the top of the column, will be comparatively high. Hereby the risk of decomposition of substances sensitive to high temperatures is increased entailing a reduction of the yield and lowering of the quality of the distillation products obtained.

In the packed columns the exchange of the lower boiling constituents of the liquid flowing downwards for the high-boiling constituents of the ascending vapours takes place on the surface of the fillings present in the column. A necessary condition for obtaining a good fractionating effect is hereby on the one hand that the fillings have a great area, on the other hand that the reflux of liquid is evenly distributed on the surface of the fillings over the whole cross-section of the column. However, on the whole, this is difficult to attain, and especially in the case of distilling in vacuum. In this case the volumes of vapour are very large, and, consequently, the columns have to be constructed with a great diameter, since otherwise, in high columns, there would be a loss of vacuum. However, under such conditions it is impossible to distribute the reflux evenly over the whole surface of the cross-section area, and the liquid will flow downwards in streams at certain places here and there in the column. This results in a poor contact between the ascending vapours and the liquid flowing downwards entailing a low fractionating effect.

The present invention relates to a distillation and rectification column uniting the advantages of the plate column and the packed column without having their inconveniences, said column being excellently adapted also for distillation under vacuum.

The distillation and rectification column according to the invention consists of a casing or column with a number of plates arranged above each other and practically horizontally, as known per se, according to the invention the plates are arranged in such a way that media-gases, vapours and liquid—passing through the column are forced to flow zig-zag upwards and downwards, respectively, through the column, without the gases and vapours being forced to pass through liquid layers, the plates being constructed or provided with turbulence devices for the gas and/or the liquid phase.

The column according to the invention principally functions as a packed column, inasmuch as the exchange of components of the vapour and the liquid takes place on the surface of the liquid. However, since the reflux of liquid flows back on the plates, the above-mentioned drawbacks concerning the distribution of the liquid connected with the usual packed column are eliminated. On the other side, there is no loss of vacuum, since the vapours do not pass through liquid layers, as is the case in the plate columns. By means of the arrangement of turbulence devices, whereby turbulence preferably occurs in the liquid phase as well as in the gas phase, an intimate contact effect between liquid and vapours and an excellent fractionating effect are nevertheless obtained.

Moreover, since the fractionation obtained for the rest is mainly determined by the length of way, on which the turbulent streams of gas and liquid are in contact with each other, there is nothing to prevent the construction of the column with a great diameter, whereby the height of the column may be reduced to a minimum. This is a great advantage, since thereby the buildings can be made considerably lower than with other types of columns.

The distillation and rectification column according to the invention is described further below with reference to the accompanying drawing which illustrates such a column schematically.

Fig. 1 shows a distillation plant with evaporator, distillation still, distillation column according to the invention and dephlegmator, with the column in vertical section, while Figs. 2 to 6 show different embodiments of the turbulence devices.

Fig. 1 shows the evaporator 1, and the distillation still 2, which may be heated in any suitable manner and from which the vapours pass into the distillation column 3 through its bottom connecting socket. In the column 3 there is a number of plates 4 made in the form of circle segments, placed at right angles to the longitudinal axis of the column and arranged in such a way that the openings for the passage of the liquid and the vapour which are formed between the wall of the column and the chord of the segments, alternately are situated at diametrically opposite sides of the column wall.

The plates 4 are on the upper side provided with turbulence devices 5 for the liquid, directed upwards, and on the under side with turbulence devices 6 for the vapours, directed downwards, arranged parallel with each other and with the chord of the segment-formed plates, as indicated in the figure (cf. also Fig. 2). Suitably, such a turbulence device 5 may be arranged outermost along the chord, so that it forms an outer edge, directed upwards, on the plate 4.

On their way upwards through the column 3 the vapours are forced to pass to and fro zig-zag between the plates 4 and past the turbulence devices 6 secured to the under side of the plates perpendicularly to the gas stream, as is indicated with arrows in the figure, and hereby they meet the liquid flowing downwards over the plates in the opposite direction zig-zag through the column. From the top of the column the vapours pass through the connection pipe 7 to the dephlegmator 8 where they are condensed. The condensate is discharged through the reflux pipe 9 from which the desired quantity may be discharged by means of the regulation valve 10 to the receiver 11, while the rest is allowed to flow back to any of the plates 4 of the column. In the example shown on the drawing the reflux pipe is placed in such a way, that the condensate is delivered on the uppermost plate 4 in the column 3.

The condensate then passes downwards through the column zig-zag from plate to plate (indicated by means of arrows directed downwards, shown at the uppermost and lowermost plates 4) and passes hereby the turbulence devices 5 secured to the upper side of the plates perpendicularly to the stream of liquid. On its way downwards over the plates 4 the liquid is swept over by the hot vapours ascending from the distillation still and hereby a part thereof is again evaporated. The liquid which has not been evaporated flows from the lowermost plate down into the distillation still 2.

For evacuation is provided a pipe connection 12, in case the plant is to be used for vacuum distillation. Further, if desired, discharge tubes for liquid from the column 3 may be arranged at one or more of the plates 4, from which it is desired to discharge liquor (not shown in the drawing).

Figs. 2 to 6 show different embodiments of the turbulence devices 5 and 6. These may suitably be constructed as flanges which according to Fig. 2 are secured substantially at right angles to the plate, according to Fig. 3 are oblique to the plate, inclined in the direction of the liquid and the vapours, and according to Fig. 4 are constructed as ridges. The arrows in the figures indicate the direction of movement of the liquid and the vapours. Figs. 5 and 6 are sections along the line V—V in Fig. 2 and corresponding sections in Figs. 3 and 4, and show in the first-named case (Fig. 5) the turbulence device with straight edge and in the last-mentioned case (Fig. 6) with toothed edge.

In the embodiment of the apparatus shown on the drawing and described obviously many alterations and modifications may be made within the scope of the invention. Thus, the plates 4 in Fig. 1, which are shown with turbulence devices according to Fig. 2, also may have turbulence devices according to any other embodiment. Instead of constructing the plates unbroken as circle segments, as indicated, they may also be circular in form and extend over the whole cross-section of the column, but in this case the plates must be provided with holes or openings for the passage of the liquid and the vapours. Said holes or openings suitably may be arranged alternately in the centre of the plate and at the periphery thereof. In this case the turbulence devices may be constructed as concentric rings arranged at a suitable distance from each other and with a profile according to any of the Figures 2-4.

According to another alternative the segment-formed plates may be provided with vertical separating walls placed at a suitable distance from the chord, parallel therewith and forming channels for gas and liquid, whereby these are forced to move in a zig-zag formed path over the plate. If the plates are circular, said separating walls are arranged spirally from the centre of the plate and outwards. In both cases the turbulence devices are placed straight over the channels formed by the separating walls.

Independently of which of the above-mentioned embodiments of plates and turbulence devices that is used, a very good fractionating effect is obtained with the distillation and rectification column according to the invention, due to the turbulence in the gas and the liquid streams.

The use of distillation columns with shelves is already known, but investigations carried out have shown, that the fractionating effect hereby attained is unimportant, since said columns have no turbulence devices.

The distillation column according to the invention may advantageously be used for distillation under normal as well as increased pressure, and further it is excellently adapted for distillation under vacuum, even a high vacuum. Thus, said distillation column has been used with great success for distilling crude tall oil in a high vacuum, as will now be described below.

The purpose of the fractionated distillation of crude tall oil is to effect a separation thereof into tall light oil, tall oil, rosin crystals and tall pitch (concerning the terminology see Svensk Pappers Tidning No. 6, 1945, pages 139-140). Since the fatty acids and rosin acids contained in the crude tall oil readily decompose at high temperatures to form unsaponifiable substances, which appear in the tall oil fraction, it is necessary to carry out said distillation in a high vacuum. As already stated above, the usual plate columns are not suitable herefor.

Further, it is important that the tall oil fraction can be obtained free from the evil-smelling and dark-coloured tall light oils and from rosin crystals which impair the value and utility of the product. Likewise the tall light oils should be as free as possible from the valuable fatty acids and, if desired, in their turn be capable of being separated into their components.

All this is attained in a satisfactory manner by means of the distillation and rectification column according to the present invention, which permits the accomplishment of such a high-vacuum distillation of sulphate soap, practically without any decomposition of fatty acids and rosin acids. The tall oil thus obtained is characterized by the analytical data set forth in the following table, whereby, for comparison, corresponding data are given for those products which with economically good result can be obtained with the best fractionating apparatus hitherto known.

|  | Tall oil obtained by means of a distilling apparatus according to the invention | Tall oil obtained by means of the best apparatus hitherto known |
| --- | --- | --- |
| Fatty acids _____ per cent__ | 95-98 | 70-85 |
| Rosin acids _____ do____ | 0-2 | 10-20 |
| Unsaponifiable substances per cent__ | 1-3 | 4-10 |
| Acid value _____ | 197-199 | 180-190 |
| Saponification value _____ | 198-199 | 180-190 |

Experiments of hydrogenating tall oil obtained by means of the distillation column according to the invention have shown that the hydrogenation can be accomplished at a considerably lower pressure than by using the tall oil products now in the market. The reason herefor is apparently the low content of rosin acids of said tall oil and its freedom from low-boiling sulphurous substances, which results have been rendered possible and been attained by using the new distillation column according to the present invention.

In addition to crude tall oil the distillation column according to the invention is also suitable for fractionating other high-boiling products, for instance fatty acid mixtures, mixtures of fatty acid esters, coal tar and wood tar, mixtures of high-boiling mono- or polyhydric alcohols, products intended to be used as softening agents and the like. Since the exchange of the high-boiling constituents of the vapours for the low-boiling constituents of the liquid takes place in the surface layer of the liquid, the distillation column according to the invention—contrary to the usual plate columns—can be advantageously used also for distilling solutions disposed to foam, when passing a gas stream therethrough.

Having now particularly described the nature of my invention and the manner of its operation what I claim is:

1. A distillation apparatus comprising a heater means, a condenser means, and a rectifying column therebetween; said column including a squat vertical cylindrical housing, a plurality of vertically spaced horizontally disposed imperforate baffle plates each in the shape of a segment of a circle and extending substantially across said housing and defining an opening between the chordal edge of the segment and the side wall of said housing, said baffle plates being disposed with said chordal edges thereof alternatingly at opposite sides of said housing to provide a tortuous extended path through the column, a plurality of upstanding spaced apart members extending across the entire top surface of each of said baffle plates parallel to said chordal edge thereof to thereby retain a body of liquid on said top surface and to render turbulent the flow of the liquid over said top surface, and a plurality of depending spaced apart members extending across the entire bottom surface of each of said baffle plates parallel to the chordal edge thereof, the bottom edges of said depending members terminating above and in close vertical proximity to the top edges of said upstanding members on the next lower one of said baffle plates; conduit means passing vapors from said heater means to the bottom of said column for passage of the vapors upwardly through said column in a tortuous fashion between said baffle plates, the flow of the vapors through said column being rendered turbulent by said depending members on said baffle plates; vapor take-off means at the top of said column communicating with said condenser means; means for feeding rectifying liquid to the top surface of the uppermost baffle plate, the liquid flowing downwardly in a tortuous path across the upper surfaces of said baffle plates; and means for removing liquid from said column and passing it to said heater means.

2. A distillation apparatus according to claim 1, wherein said upstanding members and said depending members on each of said baffle plates consist of flanges extending at right angles to the upper and lower surfaces, respectively, of said plate.

3. A distillation apparatus according to claim 2, wherein said flanges forming said upstanding members and said depending members are formed with toothed edges.

4. A distillation apparatus according to claim 1, wherein said upstanding members on the top surface of each of said baffle plates consist of flanges extending from said top surface and inclined from the vertical away from said chordal edge of said plate, and wherein said depending members on the bottom surface of each of said baffle plates consist of flanges extending from said bottom surface and inclined from the vertical toward the chordal edge of said plate.

ÅKE VILHELM BERNHARD LINDER.

REFERENCES CITED

The following references are of record in the file of this patent:

UNITED STATES PATENTS

| Number | Name | Date |
| --- | --- | --- |
| 283,025 | Rowan _____ | Aug. 14, 1883 |
| 349,449 | Peden _____ | Sept. 21, 1886 |
| 716,380 | Clawson _____ | Dec. 23, 1902 |
| 876,678 | Andres _____ | Jan. 14, 1908 |
| 1,042,055 | Theisen _____ | Oct. 22, 1912 |
| 1,826,224 | Schultze _____ | Oct. 6, 1931 |
| 1,987,097 | Coubrough _____ | Jan. 8, 1935 |
| 1,997,171 | French _____ | Apr. 9, 1935 |
| 2,012,125 | French _____ | Aug. 20, 1935 |
| 2,143,344 | Frankel et al. _____ | Jan. 10, 1939 |
| 2,176,498 | Hickman _____ | Oct. 17, 1939 |

FOREIGN PATENTS

| Number | Country | Date |
| --- | --- | --- |
| 438,527 | France _____ | Dec. 4, 1911 |
| 337,545 | Great Britain _____ | Nov. 6, 1930 |